June 24, 1969  J. W. REIS ET AL  3,451,297
SHEARING DEVICE
Filed Nov. 19, 1965

INVENTORS
JOHN M. ADAMS
JOSEPH W. REIS

BY
J W Armbruster
ATTORNEY

United States Patent Office 3,451,297
Patented June 24, 1969

3,451,297
SHEARING DEVICE
Joseph W. Reis, Wappingers Falls, and John M. Adams, Poughkeepsie, N.Y., assignors to International Business Machines Corporation, Armonk, N.Y., a corporation of New York
Filed Nov. 19, 1965, Ser. No. 508,786
Int. Cl. B26d 1/08, 5/16
U.S. Cl. 83—198                              3 Claims

ABSTRACT OF THE DISCLOSURE

A shearing device has a double shearing mechanism with a pair of dies embracing a work piece. Shearing of the work piece material is caused by cutting movement of a primary die for a distance less than the thickness of the material followed by movement of an adjacent secondary die twice as far in the same shearing direction. Such double die relative movement reduces die stresses and prevents the formation of an edge burr on the sheared material.

---

This invention relates to stock shearing devices and more particularly to a novel and efficient machine for cutting aluminum extrusions to length with a burr free edge.

The principle involved is that of a double shear of the material which reduces die breakage and eliminates the edge burr on the cut piece. The displacement of metal which occurs when the primary die starts shearing is reversed by the movement of a secondary die in the same direction. Thus, the burr does not have the usual opportunity to form along the edge of the cut material.

Therefore, an object of the invention is to provide a double shearing mechanism with a pair of dies formed to fit an extruded form. The adjacent faces of the dies are in close contact and correspondingly flat.

Another object of the invention is the provision of a shearing mechanism involving more than one shaped die. An elongated extrusion is fed through the dies and sheared into pieces of selective length. There is a close fit between a work-piece such as an extrusion and the die at the die life area.

Another object of the invention is the efficient and economical production of heat sink structures such as aluminum extrusion sections. The usual sawing or grinding methods of cutting off stock material are slow and produce excessive burrs. Removal of such burrs is a costly hand operated job.

A further object of the invention is the provision of dies set at such a cutting angle and provided with cam or kicker timing advances arranged in a dual form as to take into account the type of material being cut and the cross section areas thereof to be severed.

As an alternative to the dual form of movable shear dies, it is also proposed that one die form remain stationary as a second die is moved along back and forth to simulate dual movement.

The foregoing and other objects, features and advantages of the invention will be apparent from the following more particular description of preferred embodiments of the invention, as illustrated in the accompanying drawings.

The invention is concerned with the cutting of extruded form elongated pieces into length as illustrated in the cutting of a U-shaped aluminum extrusion, the resulting cut pieces are especially effective for use as heat sink devices. Although the invention is illustrated in connection with a U-shaped aluminum extrusion, it is to be realized that any other forms of cross sections such as I beams or L's or any other circular, tabular or elliptical configuration may be the object of the shearing mechanism and, such formations may be of sheet metal or other tin or steel alloys or relatively soft material such as plastics, fibers, or natural wood or paper. In all instances, the main object is for rapidity of severance and elimination of the overhanging material ordinarily encountered with prior art sawing, grinding, punching or severing operations.

Figure 1:
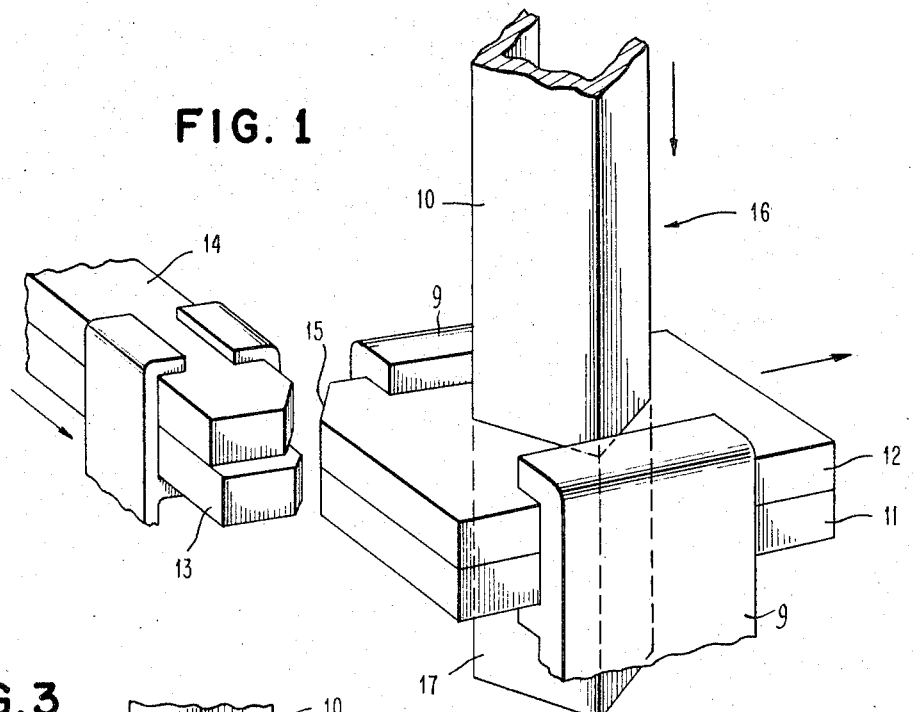
FIG. 1 is a perspective view showing an extruded form extending through the pair of die blocks.
Figure 3:
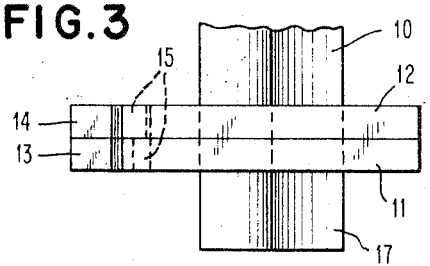
FIG. 3 is a side elevation view of the two die blocks in the normal position.
Figure 4:
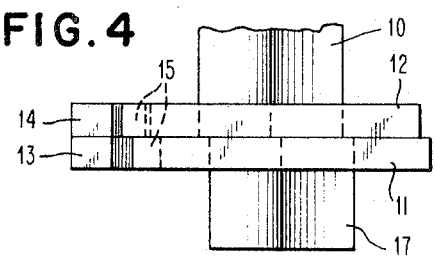
FIG. 4 is a similar elevation view showing the primary die advanced in the first stage of the cutting operation.

In the perspective view of FIG. 1, the work piece 10 is shown as freely movable but closely fitted through an opening of a corresponding configuration in two die blocks 11 and 12. Although shown as being on end, it is to be realized that usually the ends of the die blocks facing the viewer in FIG. 1 are ordinarily arranged in a downward position so that the work piece is in effect slipped horizontally through the dies. The clearance between the extrusion outer faces 10 and the die at the die life area, i.e. the cutting surfaces, must be held to a close fit. The die blocks 11 and 12 are mounted in a strong slide bed 9 allowing free movement of the blocks from left to right and also provided (not shown) is a stop mechanism and a spring return which would tend to put the blocks back into the normal position as shown. If positive main and return cams are used, then there it no need for springs or stops. Co-operating with cam formations 15 on the upper left hand corners of both die blocks is a pair of separately operating kicker cam plates 13 and 14; the plate 13 cooperating with the lower die block 11 and the upper kicker cam plate 14 cooperating with the cam formation on the upper die block 12. The kicker bar 13 is the first to be operated and it is moved forwardly to cam die plate 11 towards the right as facing in FIG. 1. The resulting movement is shown in FIG. 4 where it is seen that the lower die plate 11 is shifted towards the right and so moves with respect to the upper die plate 12 which is stationary at that time and thus causes a partial severing of the material caught between the two plates. The adjacent faces of the dies must be in close contact as confined by the bed slide 9, and they must be in one plane and reasonably flat. FIGS. 1 and 3 show the die blocks 11 and 12 in the normal aligned positions to allow free motion therethrough of the work piece 10, while FIG. 4 shows the results of the first kicker actuated shearing motion of die 11 with respect to die 12.

Figure 5:
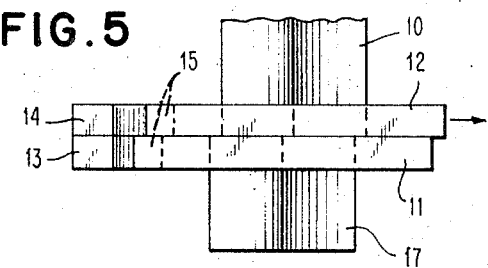
FIG. 5 is another elevation view of the two die blocks showing the second step of operation wherein the second die block is advanced beyond the first die block.

The first die motion FIG. 4 is coupled with a second die movement FIG. 5 wherein the second kicker bar 14 is brought into operation and acts against the cam face 15 on die block 12 and moves it towards the right FIGS. 1 and 5 to such an extent that it has about twice the movement of the die block 11 which is moving towards the end of its throw for part of the second period that takes place during the movement of the secondary die block 12.

The die design principle of operation is such that the primary die 11 is actuated by kicker 13 and moved to the right preliminary predetermined developed distance. In the case of an aluminum extrusion, this distance is a ratio of about 30% of the thickness of the cross section of one of the webs of the aluminum extrusion. This shearing motion distance of die 11 is controlled by the cam offset of kicker 13 with respect to the cam face and sliding edge of die plate 11. The secondary die 12 is actuated by kicker 14 which starts moving prior to the complete fracture of the material 10 caused by the action of the primary die 11. This timing of relative movement between the two dies is arranged to be carried on during the last part of the movement of the primary die. It is apparent that the secondary die 12 is moved in the same direction as the primary die and the movement of it is continued for about 70% of the smaller movement by the primary die and the extent of time covered by the extra movement is in the ratio of about 200% of the time used for the primary die movement. Upon completion of the movement of primary and secondary dies, the short severed piece of extrusion 17 is dropped off and the dies are returned to the normal home position with the die openings in alignment. During the various movements of the die plates, the end of the stock of the extrusion 16 is maintained in the secondary die plate 12 and it is from this home position in the block that the elongated length of stock is shifted to bring a new length as an extension past the severing point and in readiness for sharing another portion of the stock off the main part of the extrusion 10.

Figure 6:
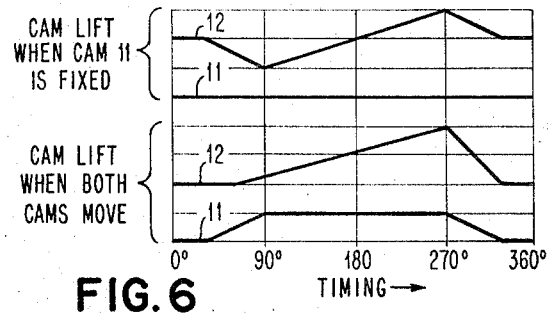
FIG. 6 is a composite time chart showing how a secondary shearing cam may be operated alone with a primary die fixed, and how two cams may be operated relative to each other to shift the two die blocks in the mode of FIGS. 3–5.

There are conditions where it is advantageous to have only one die moved. In FIGS. 3–5 it may be imagined that die 11 is held fixed and only die 12 is the one moved. Or the reverse may be the situation when a long heavy piece of stock is in die 12. At the top of the time chart, FIG. 6, a single cam lift movement is traced to illustrate a mode with 12 operating alone. The lower two lines show how 11 and 12 could be moved relative to each other in the dual actuating mode.

It is estimated that there is about a 50% reduction in unit cost by performance in the manner outlined as contrasted with cutting by conventional methods. It is contemplated that a series of standard die and kicker plate holders could be used for any number of different cutting operations. The cost of making the dies per se is low since only the blocks are to be renewed. The die stock for blocks such as 11 and 12 are hardened and ground and then a section simulating the extrusion shape to be cut is used to produce an accurate die opening. This is accomplished by using a hard metal piece shaped as the extrusion piece as an electrode in an electrical discharge machine of which several types are available, one such being illustrated in U.S. Patent 2,951,969. The extrusion end then "burns" an opening through the hardened blocks to eliminate most of the machining. In operating in this fashion, the tooling costs are held to a minimum of expense.

Aside from the economical advantages there is also the advantage of a burr free edge. The principle of operation involves the double shearing of the material which reduces die breakage and eliminates the edge burr. The displacement of metal which occurs when the primary die starts shearing is reversed by the following movement of the secondary die in the some direction. Thus, a burr does not have opportunity to form on the edge of the material.

An additional advantage is that found in the reduction of cutoff time which is approximated to be about 300%. A further advantage lies in the saving of material since there is no kerf caused by srear cutting as distinguished from grinding and sawing. The burr free edge eliminates the de-burring operation usually required and also results in substantial savings in the mode of operation.

Figure 2:
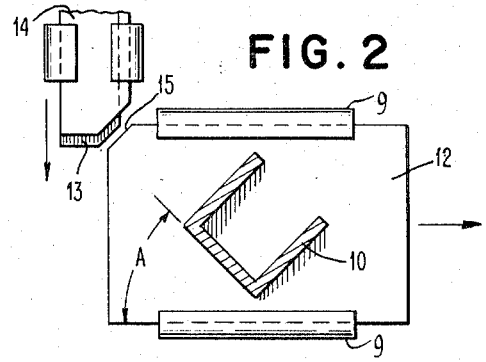
FIG. 2 is a plan view showing the extruded form in the die blocks and the kick cams restored as in the preliminary stage of operation.

The cutting angle A FIG. 2 is shown to be about 45° and this was found advisable in the case of certain aluminum alloy extrusions of a cross section as shown. As already mentioned, the kicker advance is proportioned, in this instance to be 30% of the webbed thickness. If the case of a harder material is contemplated the cutting angle would be changed to reflect the cross sectional shear area and would be less than 45°. It is noted that the cutting angle as shown is arranged to equalize as much as possible the cross section shear area operated upon by the dies at any given instant. The die motions are to be optimized for each different shape and character of the work piece.

While the invention has been particularly shown and described with reference to preferred embodiments, it will be understood by those skilled in the art that various changes in form and detail may be made therein without departing from the spirit and scope of the invention.

What is claimed is:

1. In a device for shearing pieces of an aluminum U-section extrusion stock, a pair of closely adjoining flat die blocks formed with a U-shaped opening through which said U-stock extends to be advanced and cut into pieces at right angles to the U-section, a first kicker cam bar for shifting one of said die blocks relative to the other of said die blocks which is held stationary at the time, to an extent in shear less than the thickness of said U-section of said stock, and a second kicker cam bar for shifting said other of said die blocks in the same direction as the first die block but twice as far and partially coincident with said shifting of said first die block, whereby shearing of an extrusion piece is accomplished without edge burrs.

2. In a device for cutting off lengths of stock of an elongated work piece, a pair of shear plates between which said work piece is severed, said shear plates respectively including like cutting apertures which can be placed in registration for receiving and surrounding said work piece, and means for operating one of said plates with a shearing movement relative to the other plate, wherein said other plate is held fixed while said one plate moves in a shearing fashion to cut partially across the thickness of said stock first, followed by a larger reverse motion greater than the thickness of said stock to shear off a length of stock without overhanging burrs.

3. In a device for cutting off lengths of an elongated aluminum extrusion with thin webs, a pair of cutting plates between which said extrusion is pinched and severed, and means for operating said plates independently and at different times, wherein the first of said cutting plates is moved initially by said operating means in a shearing fashion a distance which is about 30% of the thickness of a web, followed by a partly concomitant movement of the second of said cutting plates in the same direction for the remaining 70% of web thickness and beyond for a total movement of said second plate of double the distance of movement of said first plate, whereby a piece of said extrusion is sheared off without burrs.

References Cited

UNITED STATES PATENTS

| 1,091,668 | 3/1914 | Koehl | 83—627 X |
| 1,792,522 | 2/1931 | Yates | 83—198 |
| 2,648,383 | 8/1953 | Hahn | 83—623 |
| 2,728,391 | 12/1955 | Peddinghaus et al. | 83—197 X |
| 2,508,758 | 5/1950 | Hollerith | 83—51 |

FOREIGN PATENTS 884,445  7/1953  Germany.

ANDREW R. JUHASZ, *Primary Examiner.*

U.S. Cl. X.R.

83—554, 627